A. M. STANLEY.
VALVE GEAR FOR FLUID PRESSURE ENGINES.
APPLICATION FILED JULY 9, 1908.

995,384.

Patented June 13, 1911.
4 SHEETS—SHEET 1.

Fig. 1.

Witnesses
Helen Oxford
Benjamin B. Hull

Inventor,
Arthur M. Stanley,
by Albert G. Davis
Att'y.

A. M. STANLEY.
VALVE GEAR FOR FLUID PRESSURE ENGINES.
APPLICATION FILED JULY 9, 1908.
995,384.
Patented June 13, 1911.
4 SHEETS—SHEET 2.
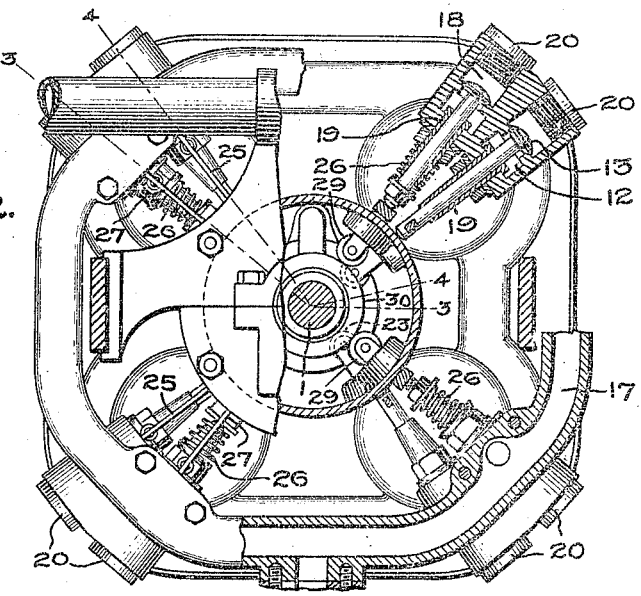
Fig. 2.
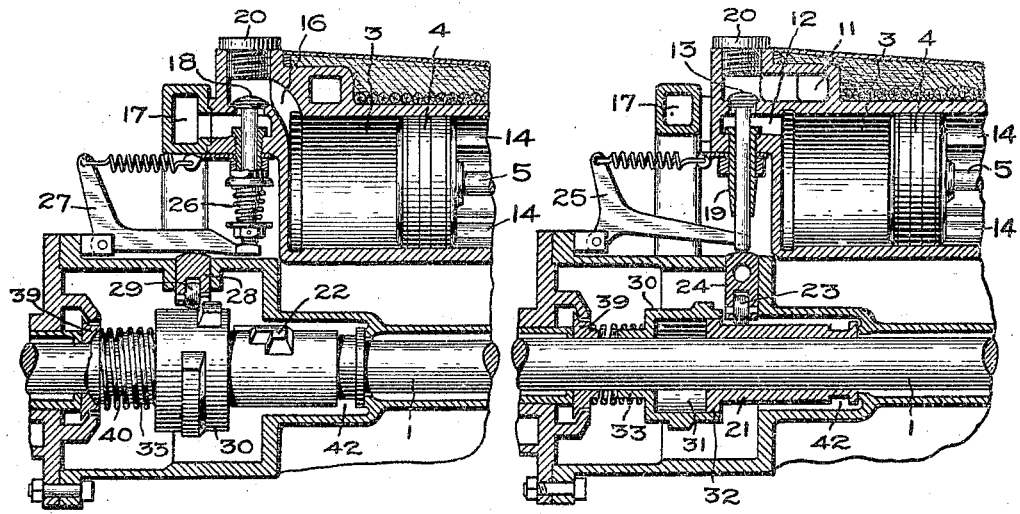
Fig. 3.
Fig. 4.
Witnesses:
Inventor,
Arthur M. Stanley,
by
Att'y.

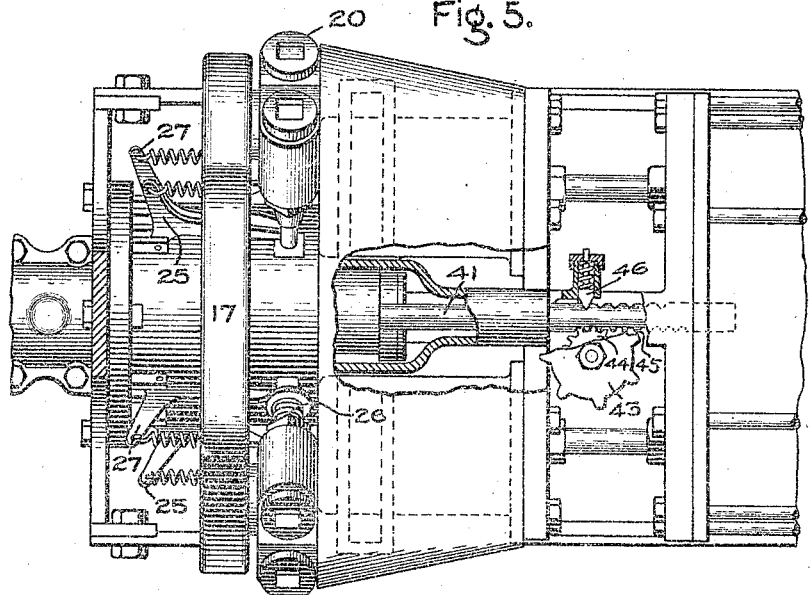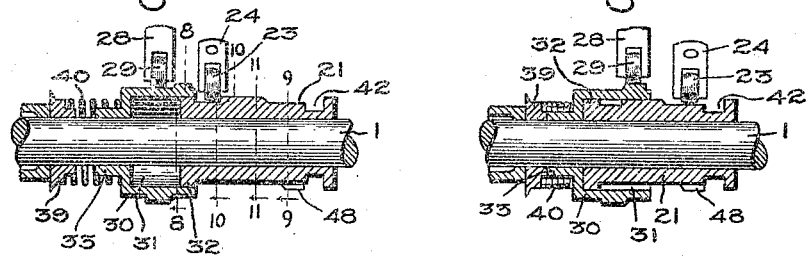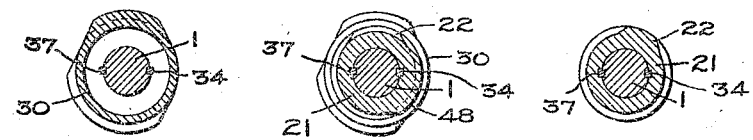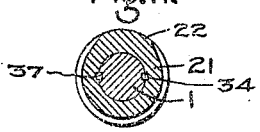

A. M. STANLEY.
VALVE GEAR FOR FLUID PRESSURE ENGINES.
APPLICATION FILED JULY 9, 1908.
995,384.
Patented June 13, 1911.
4 SHEETS—SHEET 4.
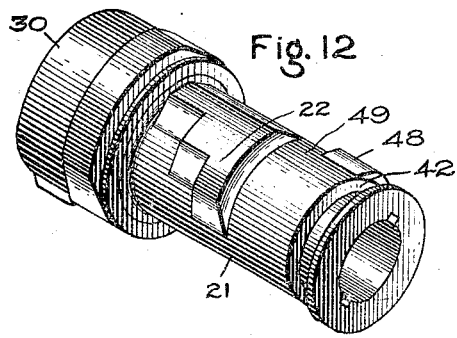
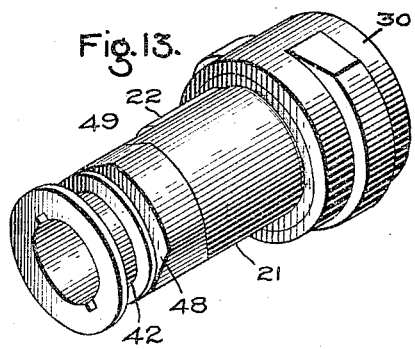
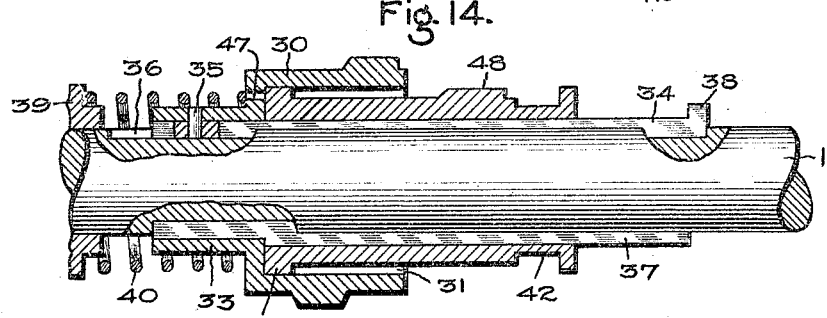
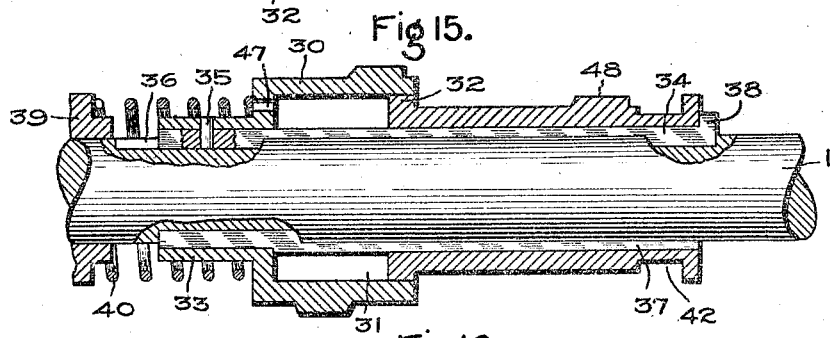
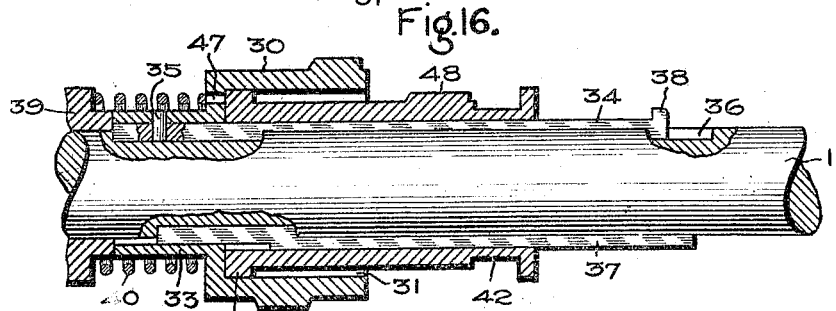
Witnesses:
Inventor,
Arthur M. Stanley,
by Albert␣␣␣Davis
Atty.

UNITED STATES PATENT OFFICE.

ARTHUR M. STANLEY, OF LYNN, MASSACHUSETTS, ASSIGNOR TO GENERAL ELECTRIC COMPANY, A CORPORATION OF NEW YORK.

VALVE-GEAR FOR FLUID-PRESSURE ENGINES.

995,384.  Specification of Letters Patent. Patented June 13, 1911.

Original application filed May 23, 1907, Serial No. 375,212. Divided and this application filed July 9, 1908. Serial No. 442,655.

*To all whom it may concern:*

Be it known that I, ARTHUR M. STANLEY, a citizen of the United States, residing at Lynn, in the county of Essex, State of Massachusetts, have invented certain new and useful Improvements in Valve-Gears for Fluid-Pressure Engines, of which the following is a specification.

This application is a division of my copending application, Serial No. 375,212 of May 23, 1907, and is filed in compliance with a requirement for division made by the United States Patent Office under the provisions of Rules 41 and 42 of Office Practice.

My invention relates to valve gears for fluid pressure engines and is illustrated as applied to a compact type of single-acting engine designed for driving automobiles, but its use is not limited to that special service nor to the particular type of engine shown.

The object of the invention is to provide a valve gear of improved construction which operates in an efficient manner to control the admission and exhaust of motive fluid to and from the engine and to secure other advantages more particularly set forth in the specification which follows.

In the accompanying drawings, representing one embodiment of my invention, Figure 1 is a vertical section of the engine with certain portions broken away; Fig. 2 is a view of the left end of the engine, Fig. 1, with some parts in section and others broken away; Fig. 3 is a section on the line 3—3 of Fig. 2; Fig. 4 is a section on the line 4—4 of Fig. 2; Fig. 5 is a partial top view of the engine with certain parts broken away and others shown in section; Figs. 6 and 7 are sectional views showing the valve operating cams in different relative positions; Figs. 8, 9, 10 and 11 are sections on the lines 8—8, 9—9, 10—10 and 11—11, respectively, of Fig. 6; Figs. 12 and 13 are perspective views of the valve cams; and Figs. 14, 15 and 16 are longitudinal sections through the cams showing them in different relative positions.

The main shaft 1, mounted in suitable bearings on the engine frame, extends longitudinally of the engine and is coupled at its end 2 to any suitable load. Grouped around the shaft in parallel relation thereto are four cylinders 3 in which pistons 4 move back and forth. Each piston is secured to one end of a rod, the other ends of the four piston rods being attached to crossheads 6 moving in guides 7. Connecting rods 8 transmit motion from the crossheads to a wabbler 9 suitably mounted on the engine frame. The wabbler in turn drives the shaft 1 by means of a crank 10 on the end of the shaft.

Steam or other motive fluid from any suitable source of supply enters the conduit 11 and is admitted to the cylinders to move the pistons in one direction, namely, toward the wabbler. In other words, the engine is single-acting. The admission of steam from this common supply conduit through the ports 12 to the cylinders is regulated by valves 13 adjacent the left ends of said cylinders. At their right ends the inner walls of the cylinders are provided with grooves or ports 14 of sufficient length to extend beyond the inner faces of the pistons when they are at the outer end of their stroke, thus connecting the steam spaces of the cylinders with a common exhaust conduit 15. These main exhaust ports 14 are opened and closed by the pistons as they pass over them. Different arrangements of ports can be employed, if desired, so long as they are located near this limit of the movement of the pistons.

Auxiliary exhaust ports 16 are located at the left ends of the cylinders. The flow of the exhaust steam through these ports 16 to an exhaust conduit 17 is regulated by suitable auxiliary exhaust valves 18. The conduits 15 and 17 can discharge separately or through a common pipe to the atmosphere or to a condenser, as desired. For convenience the steam and the exhaust valves are grouped in pairs, Fig. 2. The valves shown are of the puppet type with their stems mounted in removable bushings or sleeves 19. Plugs 20 permit access to the valves for inspection, removal or repairs.

The steam and exhaust valves are actuated by cams mounted on the shaft 1, but a separate cam shaft driven from the shaft 1 could be employed, if desired. A cam 21 splined to the shaft operates the valves 13 in proper sequence to admit steam to the several cylinders in the desired order. This steam cam has several different active surfaces 22 which can, by shifting the cam lengthwise, be brought into operative rela tion to the valves to vary the point of cut-off, and another surface 48 which is employed to reverse the direction of rotation. The cam 21 is also provided with an inactive cylindrical portion 49 located between the other two surfaces 22 and 48. When the rolls or followers 23 are in engagement with this portion of the cam the admission valves will close and the engine will stop. The rolls 23 are carried by blocks or tappets 24 slidably mounted in the engine frame with their outer ends in engagement with the stems of the steam valves. The steam valves 13 are raised from their seats by the action of the steam cam. The spring-actuated levers 25, in engagement with the steam valve stems, tend to hold the valves against their seats and to keep the followers in contact with the cams.

Springs 26 tend to hold the exhaust valves 18 to their seats. The ends of the exhaust valve stems are adjacent one arm of each of a set of spring-controlled levers 27 suitably mounted on the engine frame. A small clearance is provided between the ends of the stems and one side of the lever arms in their retracted position, so that the valves can seat themselves. The opposite sides of these arms are acted upon by the tappets 28 carrying followers 29 which are kept in contact with the cams by the action of the springs on the levers. The exhaust cam 30 is mounted on the shaft 1 to rotate therewith and has two active or working surfaces, one of which actuates the exhaust valves when the engine is rotating in one direction and the other when the reverse rotation is desired. The change from one direction to the other is obtained by shifting the cam axially on the shaft.

The exhaust cam 30 has a cylindrical bore or chamber 31 which receives the end 32 of the cam 21 and it is also provided with a hub 33 which slides on the shaft 1. The hub is fixed to the spline or key 34 by a pin 35. This key is common to both cams 21 and 30 and can slide in the keyway or slot 36. The oppositely-disposed key 37 is fixed in the shaft 1. Both cams are in sliding engagement with this last key. A lug 38 on the key 34 acts as a stop to limit the movement of the cam 21 to the right, while the travel of the key 34 is limited by the ends of the slot 36. A collar 39 is secured to the shaft 1 adjacent the hub of the cam 30. Between this collar and the cam is a spring 40 which constantly presses the cam to the right.

The cams are shifted by a rod 41 having a forked end which engages a groove 42 at one end of the cam 21. Motion is transmitted from a controlling wheel 43 to the rod by means of a gear 44 which engages a rack 45 on the rod. A spring latch 46 engages the rod and holds it and the cams in their several adjusted positions.

The apparatus illustrated can be operated at several different speeds in one direction of rotation and at but one speed in the reverse direction. These conditions can, however, be varied by suitable changes in the cam surfaces and the sequence of the operation of the steam and exhaust valves can be varied by changing the angular relation of the cams. The cam 21 is shifted to bring cam surfaces 22 of different lengths into action to vary the point of cut-off for the various speeds of the engine when rotating in the normal direction. The action of the exhaust valves remains the same during these changes. When the cam 21 is moved to its position for reverse rotation, making the portion 48 active, it is necessary to change the position of the exhaust cam 30 also. During the first series of changes the end 32 of the cam 21 slides into the cylindrical chamber 31, but the further movement which places it in its reverse position causes the part 32 to engage the bottom of the chamber, Fig. 14, and the two cams to move together to the position shown in Fig. 16. An opening 47 permits air to enter or escape from the cylinder 31 as the end of the cam moves back and forth in it. Should the spring 40 fail to return the cam 30 to its position for normal rotation of the engine when desired, the end of the cam 21 will engage the lug 38, Fig. 15, and insure its return.

The valve gear described is very compact and is readily operated to secure the desired changes in the direction and in the rate of rotation of the engine. The bulk of the exhaust steam passes out through the main ports 14 before the auxiliary valves 18 are opened. Hence, there is but little pressure on the auxiliary valves when opened, the energy expended in opening them is reduced and the wear on the valves and seats is lessened. The small quantity of vapor remaining in the cylinder after the closure of the exhaust ports 14 escapes through the auxiliary ports 16 until the piston is very near the end of its stroke. Then the valves 18 close to provide the small amount of compression needed for smooth operation. Without these auxiliary valves and their operating gear the compression would begin as soon as the main ports 14 were closed, continue throughout a large portion of the stroke, becoming relatively great, and the clearance space would have to be made larger. This high compression and increased clearance would impair the efficiency of the engine.

So much of my invention as is shown but not claimed herein forms the subject-matter of my co-pending application, Serial No. 375,212, to which reference has been previously made.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. In a single acting engine, the combination of a cylinder having steam and exhaust ports, valves for regulating the flow of steam through the ports, a cam for actuating the steam valve, a cam for actuating the exhaust valve, and means for shifting the steam cam independently of the exhaust cam to vary the point of cut-off or to stop the engine and for shifting both of the cams to reverse the engine.

2. In a steam engine, the combination of a cylinder having steam and exhaust valves, a shaft driven by the engine, steam and exhaust cams for operating said valves which are movably mounted on the shaft, means for moving the steam cam on the shaft to vary the cut-off and to stop the engine and for moving said cam to engage the exhaust cam and move therewith to reverse the engine.

3. In a steam engine, the combination of a cylinder, steam and exhaust valves mounted on the cylinder, a shaft driven by the engine, a steam cam and an exhaust cam keyed to slide on the shaft, a device which presses one cam toward the other, stops for limiting the movement of the cams along the shaft, and means for moving the cams axially of the shaft.

4. In a steam engine, the combination of a cylinder, steam and exhaust valves mounted on the cylinder, a shaft driven by the engine, a steam cam keyed to slide on the shaft, an exhaust cam having a hub keyed to slide on the shaft and a chambered portion in which one end of the steam cam slides, a spring which presses the exhaust cam toward the steam cam, stops for limiting the movement of the exhaust cam along the shaft, and means for moving the steam cam on the shaft to vary the cut-off and stop the engine, further movement in the direction of the exhaust cam bringing the end of the steam cam into engagement with the bottom of the chamber to shift both cams and reverse the engine.

5. In a steam engine, the combination of a cylinder, steam and exhaust valves mounted on the cylinder, a shaft driven by the engine, a key slidably mounted in the shaft, a steam cam connected by the key to rotate with the shaft and movable axially thereon, an exhaust cam secured to the key to move therewith, the ends of the keyway forming stops to limit the movement of the cam and key, said cam having a cylindrical chamber in which the end of the steam cam slides, a spring pressing the exhaust cam toward the steam cam, means for moving the steam cam along the shaft to vary the cut-off and to stop the engine, further movement in the direction of the exhaust cam bringing the end of the steam cam into engagement with the bottom of the chamber to shift both cams and reverse the engine, and a stop for limiting the movement of the steam cam in the direction away from the exhaust cam.

6. In a steam engine the combination of a cylinder having a steam port and main and auxiliary exhaust ports, means for opening and closing the main exhaust ports, valves for regulating the flow of steam through the steam port and the auxiliary exhaust port, a cam for actuating the steam valve, a cam for actuating the auxiliary exhaust valve which closes it subsequent to the closure of the main exhaust port, and means for shifting the steam cam independently of the auxiliary exhaust cam to vary the point of cut-off or to stop the engine, and for shifting both of the cams to reverse the engine.

7. In a single acting steam engine, the combination of a cylinder having a steam port and main and auxiliary exhaust ports, a piston in the cylinder which opens and closes the main exhaust port adjacent to the outer end of its stroke, valves for regulating the flow through the steam port and through the auxiliary exhaust port, a cam for actuating the steam valve, a cam for actuating the auxiliary valve which closes it subsequent to the closure of the main exhaust port, and means for shifting the steam cam independently of the auxiliary exhaust cam to vary the point of cut-off or to stop the engine, and for shifting both of the cams to reverse the engine.

In witness whereof, I have hereunto set my hand this seventh day of July, 1908.

ARTHUR M. STANLEY.

Witnesses:
JOHN A. MCMANUS, Jr.,
HENRY O. WESTENDARP.